Aug. 2, 1955 — A. WIRTH — 2,714,536
SCALE BEARINGS
Filed March 6, 1950 — 3 Sheets-Sheet 1
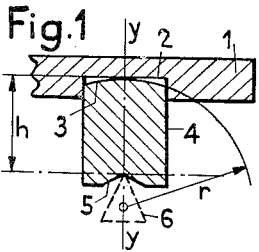
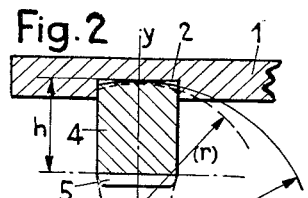
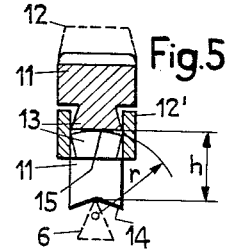
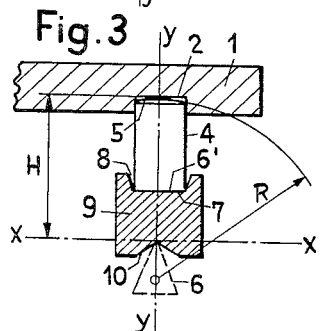
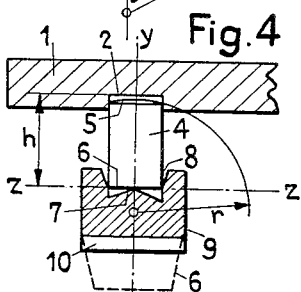
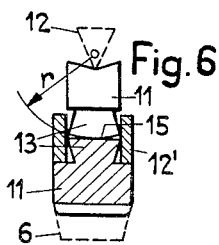
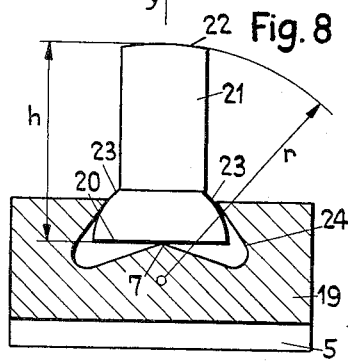
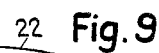
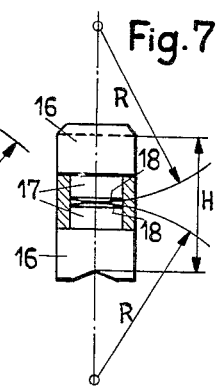
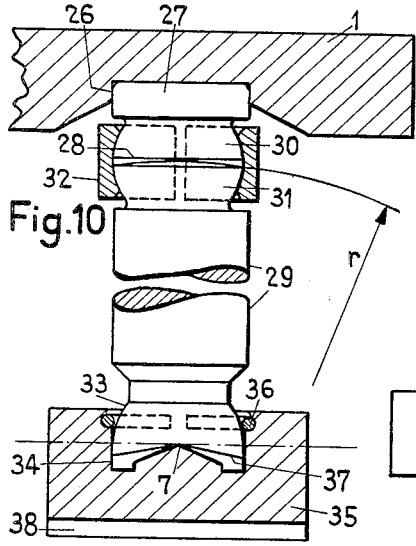
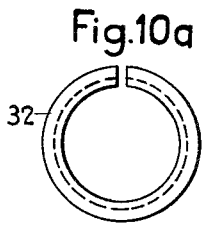
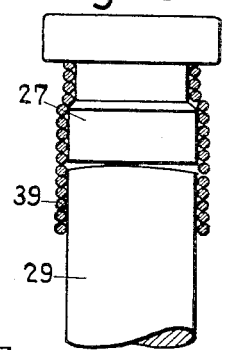
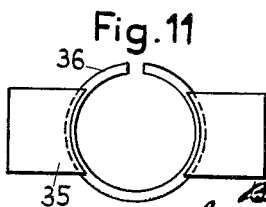
Inventor
Armin Wirth
By Singer, Stern & Carlberg
attys.

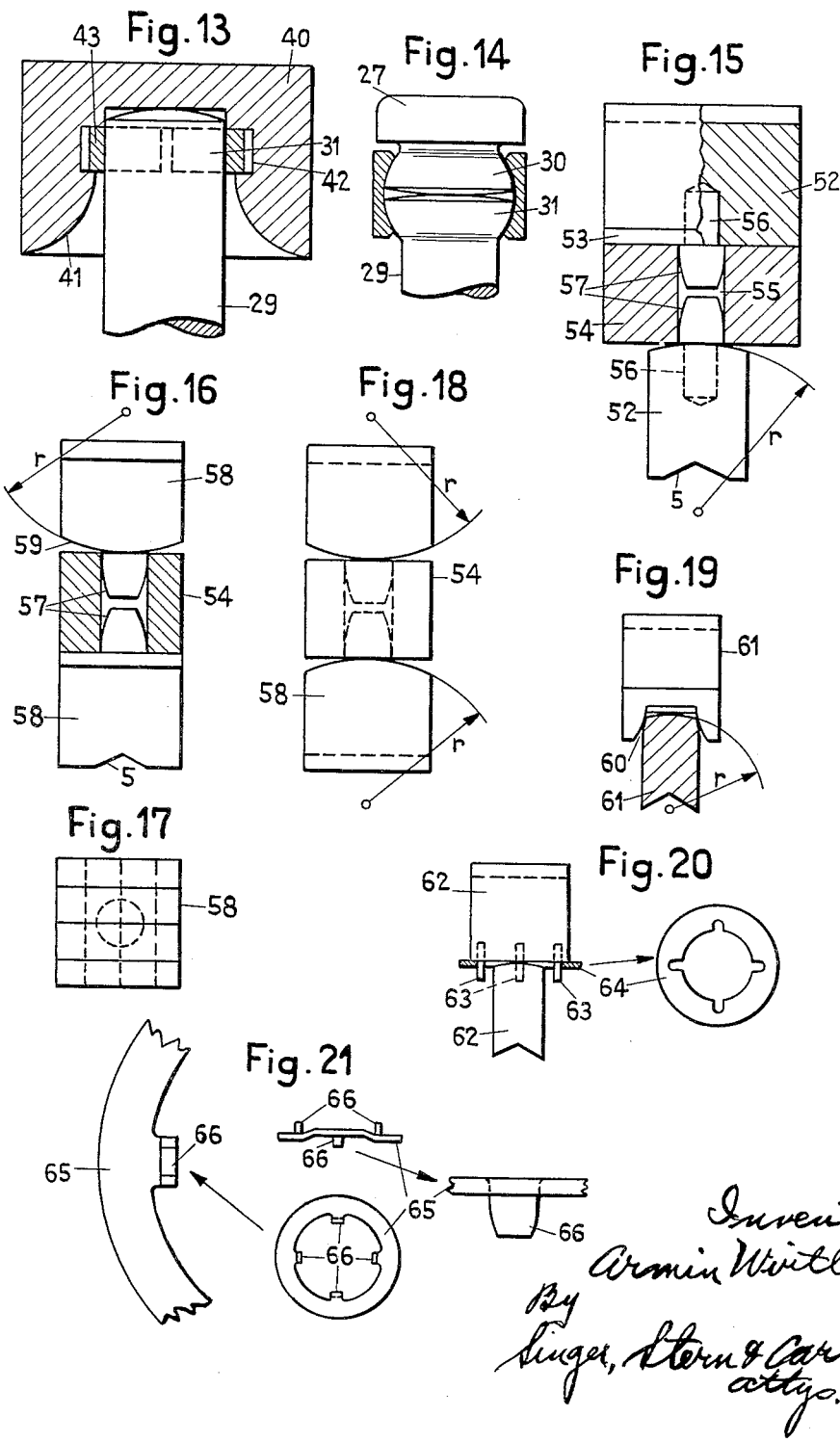

Aug. 2, 1955          A. WIRTH          2,714,536
SCALE BEARINGS
Filed March 6, 1950          3 Sheets-Sheet 3
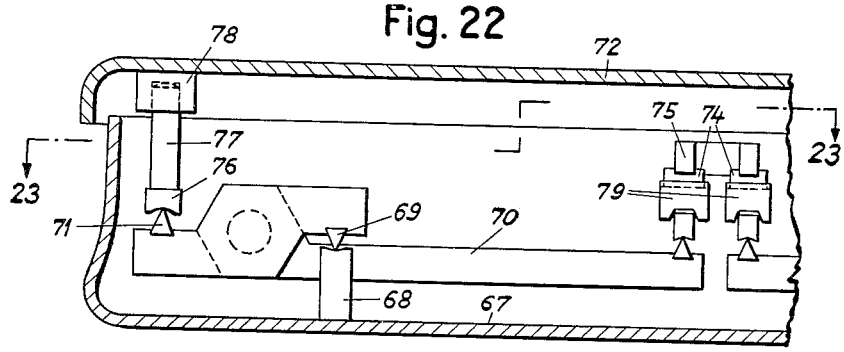
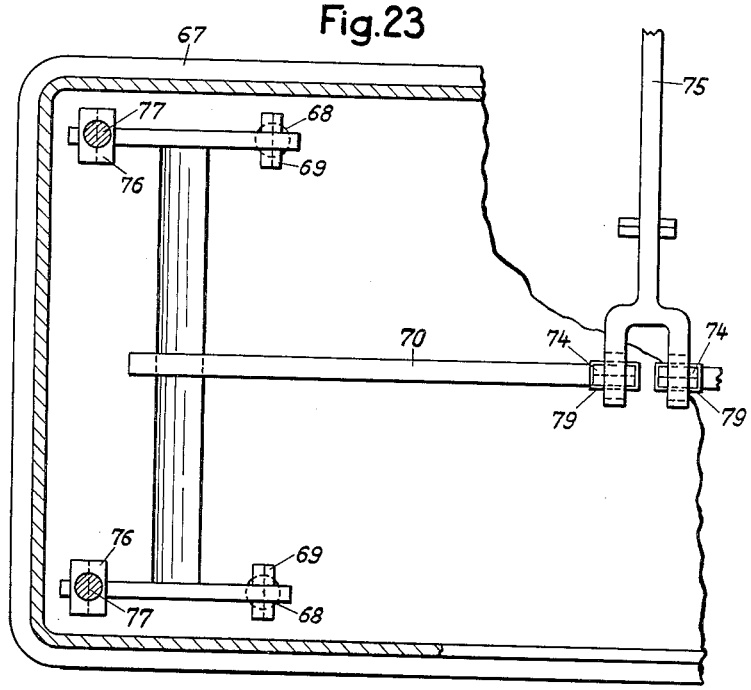

United States Patent Office 2,714,536
Patented Aug. 2, 1955

2,714,536

SCALE BEARINGS

Armin Wirth, Zurich, Switzerland

Application March 6, 1950, Serial No. 147,829

7 Claims. (Cl. 308—2)

As means of connecting compound levers to each other and also for connecting compound levers to weighbeams, so-called shackles are known and they are the means most commonly used. This method of connection has several drawbacks, particularly for heavy loads. The forces are changed in direction several times, and several parts are always connected in series and stressed by bending and tension. This gives a structure of heavy weight, requiring much space horizontally and vertically, so that the whole construction is often very expensive, quite apart from the high cost of making the connecting parts.

Various attempts are known to have been made to eliminate the drawbacks of the shackles mentioned above and to effect direct transmission of the forces (i. e. without tension elements). For example weighbeam supports and couplings between compound levers are known, in which only socket members are subjected to bending, while balls are fitted between them as transmitting elements. In said type of construction, only parallel knife-edges, or knife edges crossing at a right angle to each other, can be coupled together, unless specially made parts are used for other angles. A development of this design has elements for coupling compound levers, in which the knife-edges may be crossed at any desired angle, except in the case of very acute angles. This type is undoubtedly an improvement on the previously mentioned design, but each can only be used for coupling compound levers, not for supporting the weighbeam. The bending stresses in the socket members may, especially when more than three balls are used, be kept considerably less. However, there is the possibility that the balls lying between their socket members may move together with the cage (for instance because of vibrations), in such a way that the intended and necessary ready mobility of the knife edges is reduced.

Endeavours have been made to eliminate these drawbacks by means of a positively guided ball cage. In this arrangement, however, the balls tend to collect towards the middle, thus causing considerable friction between the cage and the balls and consequently diminishing the mobility of the socket members in relation to each other.

The present invention eliminates the drawbacks mentioned above and provides connections with exclusively pressure loaded, centrally arranged socket members and rolling elements for any steady oscillating supports of weighbeams and for any steady coupling of the compound levers at any desired angle in such a way that undesired displacements of the transmitting elements are rendered impossible.

The invention is described below with reference to the drawings, in which:

Figs. 1 and 2 show diagrammatically a weighbeam support, which oscillates in one direction in the horizontal plane and is adjustable in a different direction in the horizontal plane.

Figs. 3 and 4 show diagrammatically a weighbeam support which oscillates in two directions of the horizontal plane.

Figs. 5 and 6 show an embodiment of elements for coupling crossed knife-edges.

Fig. 7 shows a modification of the arrangement shown in Figs. 5 and 6.

Figs. 8 and 9 show a further embodiment of the invention.

Figs. 10, 10a and 11 show a still further embodiment of the invention.

Figs. 12, 13 and 14 show modifications of the embodiment of Figs. 10, 10a and 11.

Figs. 15–21 show further modifications.

Figs. 22 and 23 illustrate diagrammatically the manner in which the novel scale bearing according to this invention may be assembled with a weighbeam.

Figs. 1 and 2 show diagrammatically the construction of a support for weighbeams which oscillate in one direction. In the weighbeam 1, a recess 2 is provided. The curved upper surface 3 of a tilting-block 4 fits into the recess 2 and supports the weighbeam 1 from below. On the lower end this tilting-block 4 has a roof-shaped recess 5, which lies on the knife-edge 6 of a compound lever not shown. Consequently, between the weighbeam 1 and the knife-edge 6 a single element is inserted which is stressed only by compression and centrally. The upper end of the tilting-block 4 may have different radii $r$ and $R$, or the same radii $r$ and $(r)$ in the two different planes of projection. The radius $r$ (Fig. 1) must be greater than the height $h$ if the oscillating of the weighbeam is to be steady. The radius $R$ (Fig. 2) may have practically any desired value, care being taken only that inaccuracies in assembling and bendings of the weighbeam under load do not cause too great a displacement of the point of application out of the Y-axis.

Figs. 3 and 4 show diagrammatically the supporting of weighbeams which oscillate in any direction, this is preferred in most cases. The weighbeam 1 shows also recesses 2, and tilting-blocks 4 fitting into these recesses from below and having curved upper surfaces 5. The lower end 6' of the tilting-blocks 4, is, however, flat. It rests on an obtuse-angled knife-edge 7 within a recess 8 of a base block 9. The base block 9 has a roof-shaped recess 10 below, which rests on the knife-edge 6. The radius of the curved surface 5 may be of different size in the different planes according to Figs. 3 and 4. The radius $R$ must, however, in the case of the generally desired steady oscillating of the weighbeam, be greater than the height $h$. If the same stability of oscillating of the weighbeam is desired in both directions of the horizontal plane, the dimensions and ratio $H/R$ and $H/r$ must be exactly suited to each other. There are different values for the radii $R$ and $r$. But, since the oscillating in the Y—Z plane may be in most cases steadier than in the X—Y plane, the radii may in both cases be chosen equal, which is desirable for technical constructional reasons, but greater than $H$ (consequently a spherical surface).

The total structural height ($H$) of the base blocks and tilting-blocks may be kept very small. In spite of that the stability of the beam may be chosen as small as desired. This is a considerable advantage and compared with the arrangement according to U. S. Patent No. 2,200,141 it also gives more freedom in the choice of degree of stability. Per se the curvature of the ball sockets 2 and 3 in the above-mentioned patent could also be chosen as flat as desired (like the recess 80 in Fig. 21), in practice, however, this is found to be impossible, since the position of the balls 17 is always indeterminate, and this may lead to inaccuracies in the weight indications, as mentioned in the introduction. The arrangement according to Figs. 3 and 4 also shows direct central transmission of pressure for supporting the weighbeams. In consequence of the oscillating in all directions, two separate elements—i. e. base blocks and tilting block—are, however, necessary here, whilst with the uni-directional oscillating according to Figs. 1 and 2, a single element is sufficient.

Socket members with a transverse knife-edge on the rear side or with a transverse-curved rear side are known per se, but only in the form of so-called "adjustable" socket members. The backs of the socket members, curved or provided with a transverse knife-edge, are only intended to make it possible to adjust the bottom of the socket to the knife-edge, in order to compensate for inaccuracies in assembling or for bendings. In no case, however, is the utilisation of this rear side known as structural part of an oscillating beam support, or of an oscillating, rolling pressure connection between the knife-edges of two compound levers.

Figs. 5 and 6 show as an example an arrangement with two similar tilting-blocks 11, loaded only centrally by pressure. These transmit the pressure forces between the knife-edge 6 of the compound lever (not shown) and a knife-edge 12. The knife-edge 12 may also belong to a compound lever, or it may form part of the weighbeam 1 (not shown in Figs. 5 and 6). Exactly the same arrangement may be adapted for connecting the compound levers as for supporting weighbeams. The position of the tilting-blocks 11 with respect to each other is ensured by means of a ring 12', which engages around tenons 13 of the tilting-blocks. The tenons 13 have a conical outer surface. The surfaces 15 in contact with each other are cylindrical. The axis of each cylinder runs parallel to the edge 14 of the tilting-blocks 11. As is made clear in Figs. 1–4, here also the radius $r$ is greater than the height $h$. The arrangement according to Figs. 5 and 6 is suitable for connecting knife-edges crossing each other except at a very small angle. The knife-edges 6 and 12 are always arranged crossed at right angles for supporting weighbeams, whilst other desired angles may often be necessary when connecting compound levers. With the exception of very small angles, the arrangement according to Figs. 5 and 6 is also adaptable for connecting the knife-edges of two levers, these knife-edges being crossed as desired. On the other hand in the case of a very small crossing angle or when the knife-edges are parallel, the cylindrical surfaces 15 would be in contact substantially on one common generating line, in consequence of which there would no longer be any possibility of adjustment to compensate for inaccuracies in assembling and for bendings.

Fig. 7 shows another example similar to Figs. 5 and 6, but also adaptable for very small angles or for knife-edges in parallel. Two similar tilting-blocks 16 carry tenons 17 with conical generating lines. The surfaces 18 on the other hand are not cylindrical as in Figs. 5 and 6, but are spherical surfaces with radius R. In order to obtain similar tilting properties and thereby similar stability as in the case of the arrangement according to Figs. 5 and 6, the radius R of the spherical surface has to be about twice as great as the radius $r$ of the cylindrical surface according to Figs. 5 and 6, or greater than the total structural height H (Fig. 7). The arrangement according to Fig. 7 is thus universally adaptable for connecting two levers with knife-edges crossed as desired or parallel, and for the oscillating support of weighbeams.

Figs. 8 and 9 show an embodiment having a base block 19 with the roof-shaped recess 5 for the knife-edge (not shown). On the transverse knife-edge 7 of the base block 19, the tilting-block 21 rests with a flat surface 20 (rectangular section). At the upper end it carries the tilting surface 22 with radius $r$ (Fig. 8) and radius R (Fig. 9). The lower end of the rectangular tilting-block 21 is bounded by two surfaces 23 belonging to a cylinder, these surfaces being in contact with a dovetail-shaped recess 24 of the base block 19 and held in place by it but tiltable on the knife-edge 7. Two plates 25, fixed to the base block 19 in a manner not shown, prevent lateral deviation.

Figs. 10, 10a and 11 show a further modification. In a recess 26 in the weighbeam 1, a member 27 with a flat rolling surface 28 is fitted, secured in its position. This member 27 is supported by a tilting-block 29. The end surface 30 of the member 27 and the end surface 31 of the tilting-block 29 which face each other belong approximately to one common spherical surface, which also applies to the inner surface of a slotted spring ring 32 (Fig. 18a), which surrounds the ends 30 and 31 in such a way that when the weighbeam 1 is raised, member 27 and tilting-block 29 remain in connection with each other. The tilting-block 29 is provided at the lower end with a spherical zone surface 33. This engages in a cylindrical bore 34 of a base block 35 and is secured in its position by a spring ring 36. The lower surface 37 of the tilting-block 29 may be flat or (as shown in the drawing) roof-shaped. It rests on the transverse knife-edge 7 of the base block. The lower boundary 38 of the socket member is as usual roof-shaped and is supported on the knife-edge of the compound lever not shown in the drawing. In so far as the upper end of the tilting-block 29 is spherical with radius $r$, the lower boundary of the tilting-block 29 may also be of similar shape. In case, however, as mentioned already, that two different radii $r$ and R are required, the lower boundary 37 of the tilting-block 29 must be recessed in the form of a roof, since with a flat boundary a rotating of the tilting-block 29 and therefore an altering of the stability would be possible.

Figs. 12, 13 and 14 show further possibilities for constructing the tilting surfaces at the upper end of the tilting-blocks, similar to Figs. 10 and 11. According to Fig. 12, the position of the member 27 in relation to the tilting-block 29 is secured by a spiral spring 39. In cases where a certain restriction of the mobility between the member 27 and the tilting-block 29 is desirable, this can be taken into consideration by making the spring ring according to Fig. 10a or the spiral spring 39 according to Fig. 12, surround the end portions of the member 27 and the tilting-block 29 with a certain stress. Fig. 13 shows a further possibility of constructing the upper end 31 of the tilting-block 29 and of a member 40. This member 40 has a recess 41, flat at the bottom and also an annular groove 42 adapted to accommodate a spring 43, which ring surrounds the upper end 31 of the tilting-block 29 with the desired stress.

Fig. 14 shows that the tilting surfaces between member 27 and tilting-block 29 may also each be constructed with a spherical rolling surface with the same radius, whereby, as shown in Fig. 7, the spherical radius R of the rolling surfaces must be increased. It is also possible to provide a flat surface on the end 31 of the tilting-block and a spherical surface on the end 30 of the member 27.

Fig. 15 shows a connection, whose action is similar to that in Figs. 5 and 6. Tilting-blocks 52 are formed similar to each other. Each carries a cylindrical back 53 with radius $r$. These are supported on a plano-parallel plate 54 having a bore 55. Each tilting-block 52 is provided with a pin 56 with curved generating surface 57, and these pins extend into the bore 55 to such an extent that the tilting-blocks 52 can tilt on the flat face of the plate 54, but are prevented from being displaced on said surfaces. As mentioned in the case of Figs. 5 and 6, this arrangement is not suitable for knife-edges crossing at a small angle.

As illustrated in Fig. 15, the pins 56, 57 may be inserted into the tilting-blocks 52 or, as shown in Fig. 16, be machined from the same piece as the tilting-blocks 58.

Figs. 16 and 17 show a similar arrangement as in Fig. 15. Whilst, however, in Fig. 15 the axis of the cylindrical surface 53 runs parallel to the bottom of the socket 5, in the tilting-block 58 the cylinder axis of the surface 59 crosses the bottom of the socket 5 at right angles. The described changing of direction of the axis does not essentially alter the stability of the connection, but it has the great advantage that the connection can also be adopted for very small crossing angles and for knife-edges in parallel (see Fig. 18). Slight deviations from the correct position and any bendings can be compensated for by means of the surface 59.

Figs. 15, 16, 17 and 18 behave with respect to the tilting, similar to all the other examples. Here also only centrally stressed transmission elements are provided, but on the other hand the plate 54 is subjected to bending, even if only slightly.

The described devices for centering the surfaces tilting on each other are arranged in such a way that they can rotate as desired around the Y-axis. Naturally, devices are also possible which prevent the tilting surfaces from sliding off each other, but in which the oscillating elements cannot be rotated around the Y-axis. The tenons are preferably shaped according to the theoretical rules governing gear teeth cutting, so that practically frictionless rolling of the surfaces is possible without appreciable play transversely of the tenons.

Figs. 19, 20 and 21 show how connections of knife-edges crossed at right angles can be made in a very simple manner. In Fig. 19 the cylindrical tilting surfaces with radius r are disposed in recesses 60 with curved lateral surfaces. Two tilting-blocks 61 fit into each other in such a way that tilting is possible in any direction practically without friction. To ensure the proper position of the tilting-blocks no additional parts are required. In Fig. 20 the two tilting-blocks 62 are also slightly adjustable. Inserted pins 63 are surrounded by a thin spring disc 64 and thus ensure against sliding off. Instead of the firmly inserted pins 63 and the ring 64, the tilting-blocks 62 may also be secured together by means of a ring 65, Fig. 21, having lugs 66 which which alternately engage upwards and downwards in the bores of the tilting-blocks 62.

As has been pointed out above, generally speaking properly dimensioned cooperating tilting-blocks, one of which is curved while the other is plane, can be reversed without any essential change of the tilting characteristics. Also, as shown in Figs. 6 and 7, such a dissimilar pair can be replaced by a pair of surfaces of similar slightly-curved tilting surfaces. It is even possible, with proper dimensioning, to replace the above-mentioned pairs of plane and convexly curved surfaces by pairs of convex-concave surfaces, while preserving the stability. Such an arrangement is to be regarded as equivalent to the arrangement described.

To summarise what has been said, the special advantage of the invention is as follows:

1. The smallest possible number of parts stressed by the force to be transmitted.
2. Most favourable form of stressing of these parts by exclusively central pressure loading (except in Figs. 15–18).
3. Stability can be chosen as desired, independently of the structural height.
4. Possibility of connecting knife-edges crossed as desired.
5. Possibility of adopting exactly similar parts for connecting two levers and for supporting weighbeams.
6. Very limited space requirements in all directions.
7. The tilting-blocks made of hardened steel are often at the same time base blocks, which must in any case be made of hardened steel.
8. Due to the central transmission of the pressure, there is no tendency towards sliding of the rolling parts. If absolutely necessary, light parts ensure that the transmitting elements will not slide.
9. Practically frictionless oscillating, free from wear even in the case of very heavy loads.
10. Very inexpensive, simple and secure connection of the weighbeam support to the beam itself by means of cylindrical or conical recesses, and consequently very simple assembling.
11. Comparatively slight manufacturing cost, particularly for heavy loads, and simple construction.

Figs. 22 and 23 show an example of how the scale bearings according to the invention may be installed. A housing 67 for a weighbeam is provided at each of its four corners with a socket 68. Two levers 70 constituting a compound lever are supported on said socket members 68 by means of knife-edges 69. On knife-edges 71 on the levers 70 base blocks 76 rest, which may be formed as the base blocks 9 shown in the Figs. 3 and 4. On these base blocks 9 again tilting-blocks 77 corresponding to the blocks 21 in Figs. 8 and 9 are disposed. The upper ends of the tilting-blocks 77 are disposed in members 78 which correspond for instance to the members 40 of Fig. 13. On the members 78 a weighbeam 72 is supported. Knife edges 73 on the levers 70 transmit the load on the weighbeam 72 to members 79 which may be designed as the sockets 61 in Fig. 19. The members 79 transmit the load to the knife-edges 74 of a lever 75. This lever 75 transmits the load in a manner known per se to an indicating device (not shown).

Figs. 22 and 23 show that a very low and simple construction can be attained when using the elements according to this invention. The supporting elements of the bridge (9, 21, 40 or 76, 77, 78) do not require more height than the elements 79 coupling the levers and the lever 75.

What I claim is:

1. Self-centering support for weighbeams and similar scale members, comprising a base block the lower surface of which is shaped for engagement with a knife-edge, a tilting-block in knife-edge engagement with the upper surface of said base block, said last-mentioned knife-edge engagement forming an angle with said first-mentioned knife-edge engagement and the top surface of said tilting-block being convexly curved and engaging the underside of said weighbeam, means to prevent lateral separation of said base block and said tilting-block, and means to prevent lateral separation of said tilting-block and said weighbeam, the radius of said convexly curved surface of the tilting-block being greater than the height of said tilting-block whereby a vertical load transmitted to said tilting-block through said weighbeam urges said tilting-block towards vertical position and subjects said base block and said tilting-block to compression stress only.

2. Self-centering support for weighbeams and similar scale members, comprising a base block the bottom surface of which is shaped for tilting engagement with a knife-edge, a tilting-block in tilting engagement with the top surface of said base block and with the underside of said weighbeam so as to subject said base block to compression stress only, and means to prevent lateral separation of said tilting-block from said base block and said weighbeam, one of said tilting engagements of the tilting-block being universal and provided by a convexly curved surface having a radius greater than the height of said tilting-block whereby a vertical load transmitted to said tilting-block through said weighbeam urges said tilting-block towards vertical position.

3. In a weighing apparatus, a base block having a bottom surface and a top surface, means defining a knife-edge engagement between a compound lever and said bottom surface of said base block, a tilting-block having a bottom surface and a top surface, means defining a tilting engagement between the bottom surface of said tilting-block and the top surface of said base block so arranged as to transmit only compression stress to said base block, a weighbeam, means defining a tilting engagement between said weighbeam and the top surface of said tilting-block, one of said tilting engagements being universal and achieved through a convexly curved engagement surface having a radius greater than the height of said tilting-block so as to cause a vertical load on said weighbeam to urge said tilting-block towards vertical position, and means for preventing lateral separation of said tilting-block from said base block and said weighbeam.

4. A weighing apparatus as set forth in claim 3, in which said weighbeam comprises a scale platform.

5. A weighing apparatus as set forth in claim 3, in which said means for preventing lateral separation of said tilting-block from said base block and said weighbeam comprise a recess in the top surface of said base block and a recess in the underside of said weighbeam, respectively.

6. In a weighing apparatus, a base block having a bottom surface and a top surface, means defining a knife-edge engagement between a compound lever and said bottom surface of the base block, a recess in the top surface of said base block, a tilting block having a bottom surface and a top surface, means in the bottom of said recess and on the bottom surface of said tilting-block defining a knife-edge engagement between said tilting-block and said base block at an angle to said first-mentioned knife-edge engagement, a weighbeam, a recess in the underside of said weighbeam, said recess having a flat bottom and being engaged by said top surface of said tilting-block which is convexly curved with a radius larger than the height of said tilting-block so as to provide a universal joint which is self-centering, the arrangement being such as to subject said tilting-block and said base block to compression stress only.

7. A weighing apparatus as set forth in claim 6, in which the radius of said convexly curved top surface of said tilting-block is of different length in two perpendicular, vertical planes whereby a different degree of stability is achieved in said two planes.

References Cited in the file of this patent

UNITED STATES PATENTS

| | | |
|---|---|---|
| 372,055 | Austin | Oct. 25, 1887 |
| 516,958 | Austin | Mar. 20, 1894 |
| 949,094 | Sonander | Feb. 15, 1910 |
| 1,506,879 | Bagg | Sept. 2, 1924 |
| 2,200,141 | Wirth | May 7, 1940 |

FOREIGN PATENTS

| | | |
|---|---|---|
| 131,845 | Switzerland | Mar. 15, 1929 |